July 25, 1944. R. A. McMULLIN 2,354,325
CONVEYING APPARATUS
Filed July 14, 1942 2 Sheets-Sheet 1

Inventor:
Roy A. McMullin
by J. Stanley Churchill
Atty.

July 25, 1944.  R. A. McMULLIN  2,354,325
CONVEYING APPARATUS
Filed July 14, 1942  2 Sheets-Sheet 2

Inventor:
Roy A. McMullin
by J. Stanley Churchill
Att'y.

Patented July 25, 1944

2,354,325

UNITED STATES PATENT OFFICE 2,354,325

CONVEYING APPARATUS

Roy A. McMullin, Waban, Mass., assignor to Redler Conveyor Company, Quincy, Mass., a corporation of Massachusetts Application July 14, 1942, Serial No. 450,877

5 Claims. (Cl. 198—212)

This invention relates to conveying apparatus for conveying flowable solid material.

The invention has for an object to provide a novel and improved conveying apparatus adapted to withdraw flowable solid material from a storage bin or other source of supply and to convey the material thus withdrawn in a novel manner and in a plurality of separate paths, each of which is arranged to distribute the material being conveyed to a plurality of delivery points.

Another object of the invention is to provide novel and improved conveying apparatus of the character specified which is self-regulating to continuously supply material in desired amount in the separate paths above referred to.

With these general objects in view and such others as may hereinafter appear, the invention consists in the conveying apparatus and in the various structures, arrangements and combinations of parts hereinafter described and particularly defined in the claims at the end of this specification.

Figures 1, 2:
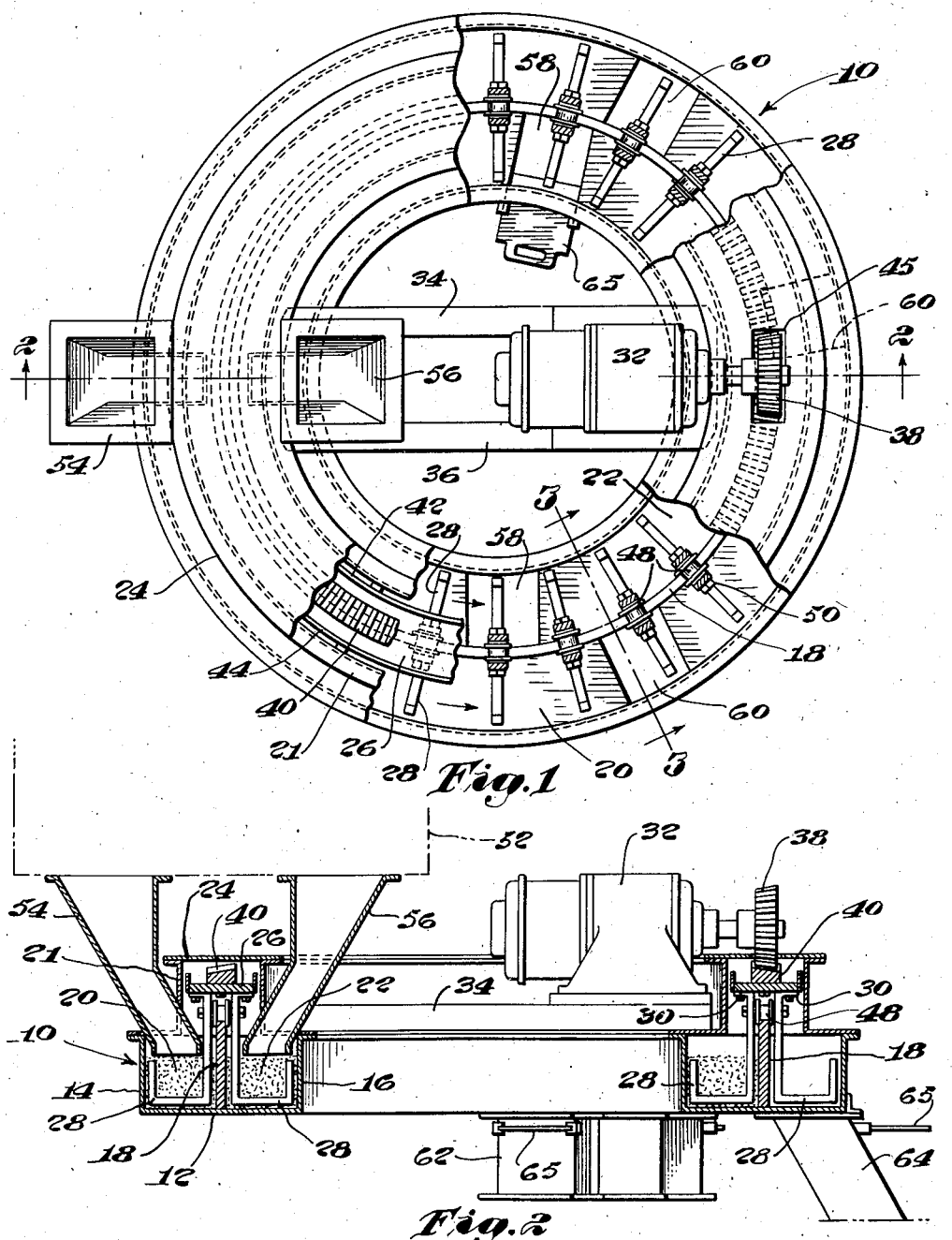
Figure 3:
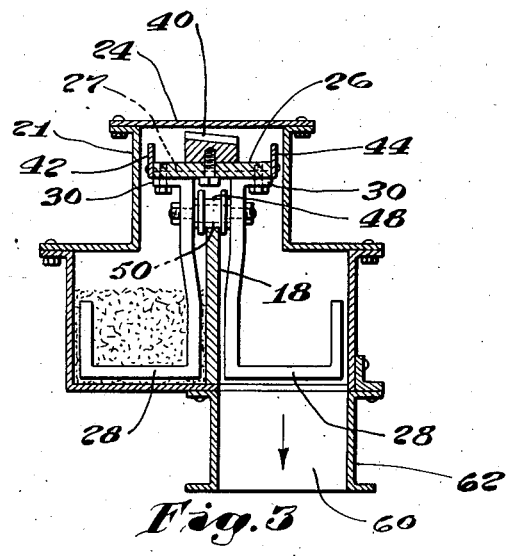
Figure 4:
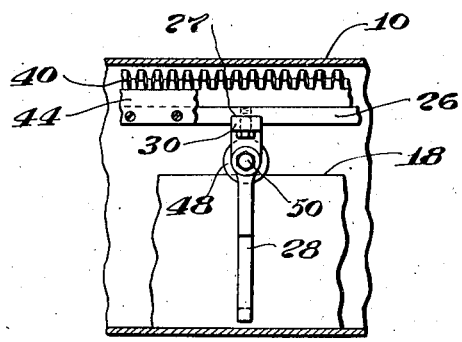

In the drawings illustrating the preferred embodiment of the invention, Fig. 1 is a plan view of conveying apparatus embodying the present invention, some of the parts being broken away; Fig. 2 is a cross-sectional view taken on the line 2—2 of Fig. 1; Fig. 3 is a cross-sectional view taken on the line 3—3 of Fig. 1; and Fig. 4 is a detail view in side elevation, to be referred to.

In general, the present invention contemplates conveying apparatus of the character specified adapted to convey the material in a plurality of circular paths and to discharge the material through one or more openings in said paths to various points of distribution such as to the supply hoppers of packaging machines, to various storage bins, or into other conveyers for delivery to more remote distribution points. The material is conveyed through a circular trough divided to provide at least two circular paths and the material is deposited in the trough from a storage bin or other source of supply from which the material is withdrawn by gravity. The conveying element may be continuously operated and is adapted to recirculate the material in substantially uniform and continuous streams whenever the various distribution points become completely filled and in a manner such that the source of supply is automatically cut off when the trough becomes completely filled, permitting only sufficient material to enter to maintain the various distribution points constantly supplied with material. Thus, the various feeding points may be continuously supplied with material in a self-regulating and automatic manner, eliminating the necessity for starting and stopping the apparatus.

The present device is particularly adapted for use in distributing material to the supply hoppers of a battery of filling or weighing machines, the efficiency in operation of which is effected, to some extent at least, by the head of material in the supply hopper. With the present apparatus the supply hoppers may be maintained filled at a constant level so that a substantially uniform head of material therein may be maintained at all times.

Another advantage of the present conveying apparatus resides in the fact that it is adapted to handle at least two different commodities for distribution to the supply hoppers of the different machines. Furthermore, the relative capacity of the various conveying runs may be varied by changing the size of one run as compared to the other.

Referring now to the drawings which illustrate the preferred embodiment of the invention, 10 represents a stationary circular trough or casing having a bottom wall 12 and side walls 14, 16 and provided with a partitioning member 18 to subdivide the trough into two circular paths 20, 22. The trough may and preferably will be provided with an intermediate casing 21 and a cover member 24 to protect the material and to render the casing substantially dust proof as the material is being conveyed therethrough.

The conveying mechanism includes an annular driven member 26 provided with a plurality of open flights 28 attached to the underside thereof. The conveying flights 28 may and preferably will comprise individual U-shaped bars arranged in spaced relation and forming two concentric rows of flights shaped and mounted to sweep the bottom and side walls of the casing and the partitioning members in their respective circular paths 20, 22 but preferably without engaging the same. The upper ends of the U-shaped flights are provided with flanged portions 30 adapted to be bolted to the annular member 26 in grooves 27 provided in the underside thereof, as illustrated, each groove being arranged to receive two flights arranged in opposed relation and traveling in separate paths.

Provision is made for driving the annular member 26 and, as herein shown, an electric motor 32 mounted on cross bars 34, 36 extending across the central portion of the circular trough, is provided with a pinion 38 arranged to cooperate with an annular gear 40 attached to the annular member 26. The edges of the annular driven member may be provided with upwardly extended flanges 42, 44 as shown, in order to prevent any lubrication applied to the gear members from coming in contact with the material being conveyed. The cover member 24 is provided with an opening 45 to provide clearance for the pinion 38, as shown.

Provision is made for supporting the annular member 26 and for guiding the flight members 28 in their travel through the circular paths and, as herein shown, the upper edge of the partitioning member 18 is arranged to form a track upon which flanged rollers 48 are arranged to run. As best shown in Fig. 3, a roller 48 is provided for each pair of opposing flights 28, and is rotatably supported between the flights upon a stud 50 attached to and arranged to connect a pair of opposing flights.

From the description thus far it will be observed that the material introduced into the casing or trough 10 is conveyed in two separate circular and concentric paths. The material is introduced into the trough from a storage bin 52 or other source of supply disposed above the trough as indicated in dotted lines in Fig. 2 and from which the flowable solid material is permitted to flow by gravity through separate funnels 54, 56 in communication with their respective paths or conveying runs 20, 22. As illustrated in Fig. 2, the funnels 54, 56 extend through openings in the intermediate casing 21, the bottom of each funnel terminating immediately above the level of the upper end of the shorter leg of the U-shaped flights. In operation, the material in each run of the trough is circulated in a continuous and substantially uniform stream, the height of the stream being determined by the level of the bottom of the funnels 54, 56, and by the length of the shorter leg of the flights. With this construction, the material will flow into the trough until each conveying run is filled whereupon the conveyer will refuse to accept more material from the supply bin.

Referring now to Figs. 1 and 2, each conveying run 20, 22 is provided with one or more discharge openings 58, 60, in the bottom wall 12 which may be connected to various delivery points, such as the supply hoppers of packaging machines, not shown, by conduits 62, 64. Each connecting conduit may extend in any desired direction, as shown, to communicate with its delivery point. Each opening is preferably provided with a manually operated shutter 65 in order to enable the supply to a particular machine to be terminated when desired.

From the above description it will be observed that in operation, the material being withdrawn from the storage bin 52 is conveyed through the circular paths and is permitted to flow by gravity through the several discharge openings. When the material being conveyed reaches the first discharge opening, the bulk of the material will be discharged therethrough until the hopper or bin or like delivery point is filled, whereupon the stream being conveyed will pass over the completely filled discharge opening and continue on to fill the next discharge opening in a similar manner, and so on until all the discharge points are completely choked off. Thereafter, the stream of material being conveyed will be recirculated in a continuous moving column back to the inlet point where the obstruction of the moving column will prevent more material from entering through the funnels. Thereafter, as the supply hoppers of the filling or weighing machines or other delivery points become depleted through withdrawal of the material from the hoppers by the various machines, the hoppers will be immediately supplied with material from the continuously moving stream so that in operation, the supply hoppers are at all times automatically maintained at their full capacity. It will also be observed that any or all of the distribution points may be cut off by closing the shutters 65 without affecting the operation of the conveyer, that is, the conveyer will not become overloaded, the material merely being recirculated as desired.

While the preferred embodiment of the invention has been herein illustrated and described, it will be understood that the invention may be embodied in other forms within the scope of the following claims.

Having thus described the invention, what is claimed is:

1. Conveying apparatus for distributing flowable solid material comprising a plurality of concentric circular troughs, a partitioning member separating said troughs, conveying mechanism including an annular driven member disposed above said troughs, a plurality of spaced flight members carried by said annular member to move therewith, said flights being arranged in concentric rows and running in their respective circular troughs, a source of supply of flowable solid material in communication with each of said troughs, each of said troughs being provided with at least one discharge opening, and means for driving said annular member, said annular member and the flight members carried thereby being supported on and guided by said partitioning member.

2. Conveying apparatus of the character described comprising a plurality of concentric troughs, a partitioning member separating said troughs, an annular driven member disposed above said troughs, a plurality of spaced U-shaped flight members carried by said annular member to move therewith, said flight members being arranged in concentric rows to run in said troughs, a source of supply of flowable solid material in communication with said troughs, each of said troughs being provided with at least one discharge opening, and means for driving said annular member, said annular member and the flight members carried thereby being supported on and guided by said partitioning member.

3. Conveying apparatus for distributing flowable solid material comprising a plurality of concentric circular troughs, an annular driven member disposed above said troughs, a plurality of spaced flight members carried by said annular member and arranged in concentric rows to run in their respective circular troughs, a source of supply of flowable solid material in communication with said troughs, each of said troughs being provided with at least one discharge opening, means for driving said annular member, and guiding and supporting means for said annular member arranged to maintain said rows of flights spaced from the side and bottom walls of said troughs, said troughs projecting beyond the outer and inner edges of the annular member.

4. A self-regulating feeding device for distributing flowable solid material comprising a plurality of concentric circular troughs, an annular driven member disposed above said troughs, a plurality of spaced open flight members carried by said annular member to move therewith, each of said flights being substantially U-shaped and having one leg thereof terminating below the top of the troughs, said flights being arranged in concentric rows to run in their respective circular troughs, a funnel for each trough having its outlet end extending below the top thereof and terminating above said one leg to provide a source of supply of flowable solid material in communication with said troughs, each of said troughs being provided with at least one discharge opening, and means for continuously driving said annular member, the relationship between the inlet ends of the funnels and the top of said legs operating to convey the material in substantially uniform streams and to recirculate the material in their respective troughs when said discharge openings are completely filled, said streams being arranged to obstruct said source of supply and to prevent introduction of addition material from said funnels until the material being conveyed is again being discharged through said discharge openings.

5. Conveying apparatus of the character described, comprising a circular trough, a partitioning member in said trough arranged to form two concentric paths, conveying mechanism including an annular driven member disposed above said trough, a plurality of spaced U-shaped flight members carried by said annular member and arranged in two concentric rows to run in their respective paths, means for driving said annular member, a source of supply of flowable solid material in communication with said paths, a plurality of discharge openings in said paths, and means for guiding and supporting said conveying mechanism including flanged rollers carried by said flights and arranged to run on top of said partitioning member.

ROY A. McMULLIN.